United States Patent
Gross et al.

(10) Patent No.: US 10,621,141 B2
(45) Date of Patent: Apr. 14, 2020

(54) MULTIVARIATE MEMORY VECTORIZATION TECHNIQUE TO FACILITATE INTELLIGENT CACHING IN TIME-SERIES DATABASES

(71) Applicant: Oracle International Corporation, Redwood Shores, CA (US)

(72) Inventors: Kenny C. Gross, Escondido, CA (US); Mengying Li, La Jolla, CA (US); Dieter Gawlick, Palo Alto, CA (US); Zhen Hua Liu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 253 days.

(21) Appl. No.: 15/885,600

(22) Filed: Jan. 31, 2018

(65) Prior Publication Data
US 2019/0236162 A1   Aug. 1, 2019

(51) Int. Cl.
*G06F 16/174* (2019.01)
*G06F 16/22* (2019.01)
(Continued)

(52) U.S. Cl.
CPC ...... *G06F 16/1744* (2019.01); *G06F 16/2237* (2019.01); *G06F 16/2453* (2019.01); *G06F 16/24561* (2019.01)

(58) Field of Classification Search
CPC ............. G06F 16/1744; G06F 16/2237; G06F 16/2453; G06F 16/24552; G06F 16/24561; G06F 16/2477
See application file for complete search history.

(56) References Cited

U.S. PATENT DOCUMENTS 7,945,570 B2   5/2011   Papadimitriou et al.
8,219,574 B2   7/2012   Liu et al.
(Continued)

FOREIGN PATENT DOCUMENTS

CN   105426511 A   3/2016

OTHER PUBLICATIONS

Huang et al.; "Pattern recognition in time series database: A case study on financial database" available online at www.sciencedirect.com, Expert Systems with Applications 33 (2007) pp. 199-205.
(Continued)

*Primary Examiner* — Richard L Bowen

(57) ABSTRACT

The disclosed embodiments relate to a system that caches time-series data in a time-series database system. During operation, the system receives the time-series data, wherein the time-series data comprises a series of observations obtained from sensor readings for each signal in a set of signals. Next, the system performs a multivariate memory vectorization (MMV) operation on the time-series data, which selects a subset of observations in the time-series data that represents an underlying structure of the time-series data for individual and multivariate signals that comprise the time-series data. The system then performs a geometric compression aging (GAC) operation on the selected subset of time-series data. While subsequently processing a query involving the time-series data, the system: caches the selected subset of the time-series data in an in-memory database cache in the time-series database system; and accesses the selected subset of the time-series data from the in-memory database cache.

17 Claims, 7 Drawing Sheets
(2 of 7 Drawing Sheet(s) Filed in Color)

(51) Int. Cl.
*G06F 16/2453* (2019.01)
*G06F 16/2455* (2019.01)

(56) References Cited

U.S. PATENT DOCUMENTS

| | | | |
|---|---|---|---|
| 8,370,586 B2 | 2/2013 | Whisnant et al. | |
| 9,244,887 B2 | 1/2016 | Leonard et al. | |
| 9,507,718 B2 | 11/2016 | Rash et al. | |
| 2016/0171037 A1* | 6/2016 | Mathur | G05B 17/02 |
| | | | 707/754 |
| 2016/0371293 A1* | 12/2016 | Luna | G06F 12/121 |
| 2017/0161340 A1 | 6/2017 | Dannecker et al. | |
| 2018/0088813 A1* | 3/2018 | Agrawal | G06F 3/064 |
| 2018/0114121 A1* | 4/2018 | Rana | G06Q 10/0639 |
| 2019/0026329 A1* | 1/2019 | Gaumnitz | G06F 16/24568 |
| 2019/0034497 A1* | 1/2019 | Song | G06F 16/248 |
| 2019/0163549 A1* | 5/2019 | Huang | G06N 20/00 |

OTHER PUBLICATIONS

Pelkonen et al.; "Gorilla: A Fast, Scalable, In-Memory Time Series Database", Proceedings of the VLDB Endowment, vol. 8, No. 12, Copyright 2015 VLDB Endowment 2150-8097/15/08.

\* cited by examiner

MULTIVARIATE MEMORY VECTORIZATION TECHNIQUE TO FACILITATE INTELLIGENT CACHING IN TIME-SERIES DATABASES

BACKGROUND

Field

The disclosed embodiments generally relate to techniques for optimizing performance in database systems. More specifically, the disclosed embodiments relate to a multivariate memory vectorization (MMV) technique that facilitates intelligent pre-caching of time-series data to improve performance for database operations involving the time-series data.

Related Art

Enormous numbers of sensors are presently being deployed to monitor the operational health of critical assets in various systems. For example, a medium-sized computer data center can include over 1,000,000 sensors monitoring thousands of business-critical servers, a modern passenger jet can include 75,000 sensors, and an oil refinery can include over 1,000,000 sensors. These sensors produce large volumes of time-series data, which is typically stored in time-series databases. As these time-series databases continue to grow, it is becoming increasingly important to be able to efficiently perform database queries involving the time-series data. Existing techniques for processing such queries are inefficient because they often consume all available memory in a database system, and consequently cause performance problems as database queries that lack sufficient memory begin to access data from rotating storage.

For common types of database queries, the entire database of signals is rarely relevant because much of the data comprises useless random measurement noise. Moreover, there exist large performance penalties for loading gigabytes (or even terabytes) of observations that contain useless noise into cache because these observations will be discarded anyway during later processing operations.

Hence, what is needed is a technique for reducing the caching requirements for time-series data to improve performance for associated database queries.

SUMMARY

The disclosed embodiments relate to a system that caches time-series data in a time-series database system. During operation, the system receives the time-series data, wherein the time-series data comprises a series of observations obtained from sensor readings for each signal in a set of signals. Next, the system performs a multivariate memory vectorization (MMV) operation on the time-series data, which selects a subset of observations in the time-series data that represents an underlying structure of the time-series data for individual and multivariate signals that comprise the time-series data. While subsequently processing a query involving the time-series data, the system: caches the selected subset of the time-series data in an in-memory database cache in the time-series database system; and accesses the selected subset of the time-series data from the in-memory database cache.

In some embodiments, the MMV operation selects the subset of observations that represents the underlying structure of the time-series data with respect to one or more of the following: serial correlation, cross correlation, seasonality and stochastic structure.

In some embodiments, while performing the MMV operation on the time-series data, the system first scales observations for each signal in the time-series data using the mean center, unit variance technique. Next, the system divides the observations in the scaled time-series data into a set of windows associated with consecutive time intervals. Then, for each window in the set of windows, the system selects observations that include minimum and maximum values for each signal in the set of signals. For all remaining observations in each window, the system computes a Euclidean norm, and then sorts the remaining observations in each window based on the Euclidean norms. Next, the system uniformly selects a subset of the remaining observations based on the sorted Euclidean norms. Finally, the system unscales all of the selected observations.

In some embodiments, after performing the multivariate memory vectorization operation on the time-series data, the system performs a geometric aging compression (GAC) operation on the time-series data, wherein the GAC operation compresses observations by averaging pairs of consecutive observations. During the GAC operation, the system: does not compress a most-recent window of observations; compresses a next-most recent window of observations once; compresses a third-most recent window of observations twice; and compresses an $n^{th}$-most recent window of observations n−1 times.

In some embodiments, the system receives the time-series data directly from sensors, which generated the observations that comprise the time-series data.

In some embodiments, the system retrieves the time-series data from a storage medium in the time-series database system.

In some embodiments, after performing the MMV operation, the system stores the selected subset of observations in rotating storage in the time-series database system. The system then caches the selected subset of the time-series data by moving the selected subset of observations from the rotating storage to the in-memory database cache.

In some embodiments, the time-series data system comprises a multi-dimensional time-series database system.

BRIEF DESCRIPTION OF THE FIGURES

The patent or application file contains at least one drawing executed in color. Copies of this patent or patent application publication with color drawing(s) will be provided by the Office upon request and payment of the necessary fee.

Figure 1:
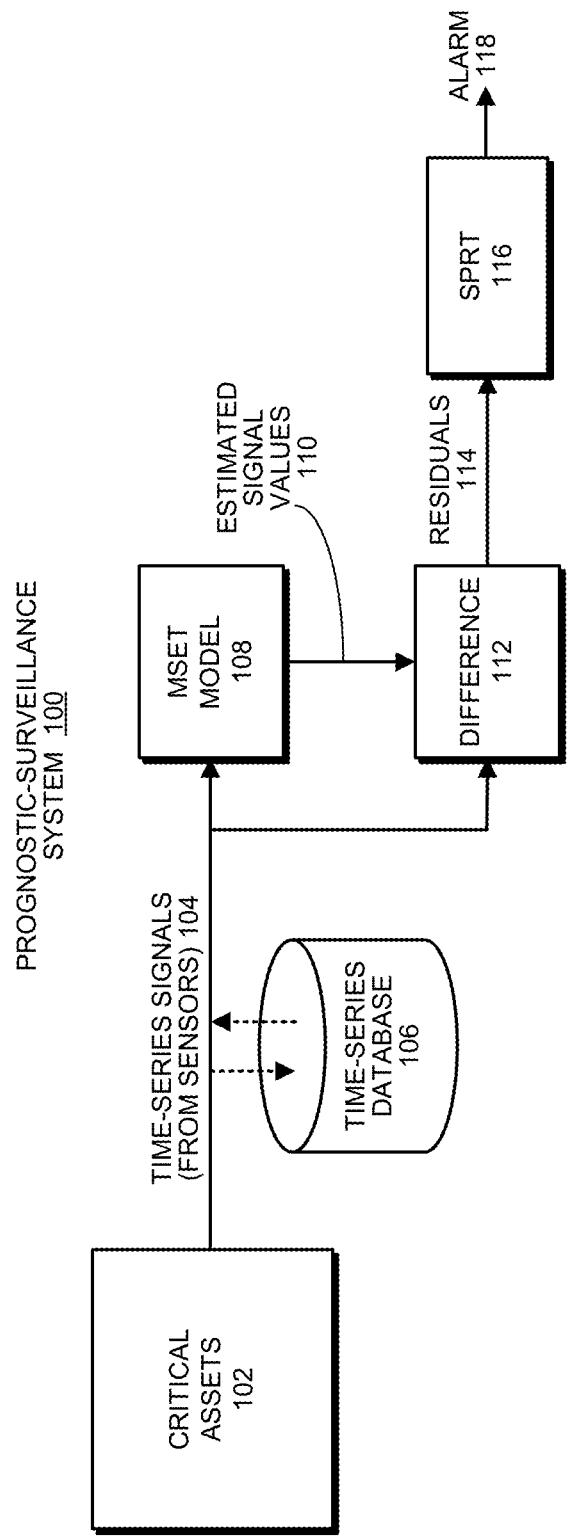
FIG. 1 illustrates an exemplary prognostic-surveillance system in accordance with the disclosed embodiments.

Table I displays exemplary sizes for ensemble averages after geometric aging compression in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments implement a new technique for efficiently caching time-series signals. This new technique operates by processing a large database of time-series signals and intelligently selecting an optimal subset of observations that embody the structure of the original larger dataset. Note that by the term "structure," we refer to the degree of serial correlation, cross correlation, and also stochastic distributions for the individual and multivariate signals that comprise the time-series database.

Existing database systems that process time-series data operate by simply caching everything that fits into memory. This provides incentives to make memories increasingly larger for database servers, which benefits manufacturers of such servers. However, there is a growing downside to large "big data" applications. As IoT sensors become increasingly more dense and the sampling rates for such sensors have also increased, this has caused the size of typical time-series databases to grow geometrically because ever higher numbers of sensors are operating at ever higher sampling rates. To address this problem, our new technique pre-caches into memory an optimal subset of the time-series database with the highest inherent relevance. During operation, the new technique sifts through the time-series database and infers the structure of the data. It then culls an optimal subset of the time-series observations that best represents the structure of the data, and also statistically consolidates the most-relevant data using a second technique called "geometric aging compression" (GAC). This new approach not only makes better decisions about which data should be cached for high performance, availability, scalability and reliability via replication, but also for "downstream" sharding and caching in subsequent customer workloads.

This new technique is a synergistic combination of two elemental operations: multivariate memory vectorization (MMV) and GAC. MMV is used to systematically select a subset of the time-series data that most optimally represents the underlying structure of the data with respect to serial correlation, cross correlation, and stochastic structure. MMV, in effect, "weeds out" this most-relevant subset of structural observations from the much larger "dark data," which is essentially random noise and is not relevant for the most-common use cases. The second elemental operation is GAC, which further reduces the size of the selected subset of time-series data. The integration of a database query with both MMV with GAC creates a time-series database system that makes better decisions about which data should be cached for high performance, availability, scalability and reliability via replication, and also for "downstream" sharding and caching during subsequent customer workload operations. Also, in addition to improving cache-related performance, this new technique provides a number of "side benefits," because there will be less impact on CPU performance, and on downstream processing of the data minus all the "dark data" noise. There will also be less impact on downstream I/O bandwidth performance due to congestion.

Hence, the disclosed embodiments identify and extract a minimal subset of vectors (observations across rows for all of the time-series data in the database) that optimally represents the true structure of the time-series signals. This minimal subset of vectors is used to improve caching performance in large-scale time-series databases for dense-sensor IoT applications.

Pre-caching for database queries has been studied extensively. Most approaches keep track of how often data is accessed, for example, by using heat-maps. This information is then used to determine what data to cache, versus what data to move to archival storage. However, in many cases, when data is accessed to answer a query, the data is not necessarily needed to answer the query. For example, a query may be executed using a full table scan even if only a small part of the table's data affects the query result. Consequently, these approaches may end up caching data that is not useful for answering queries.

For large-scale time-series databases comprising digitized sensor observations, we know from time-series analytics (and from the physics of sensing) that only a small portion of the time-series database represents the true structure of the parameters the sensors have measured, such as temperatures, voltages, currents, revolutions-per-minute (RPMs) for rotating machines, radiation levels, and vibration levels. Data that represents the underlying structure of the time-series data, in terms of serial correlation, trends, cross correlation, and seasonality, has the highest relevance for downstream analytics, whereas "random noise" associated with the signals has the lowest relevance.

Unlike "inventory type" databases or financial accounting databases, in large scale time-series databases, it is well-known that many inputs in the provenance-set (i.e., originally measured time-series observations) may only minimally affect the result of a query. Because small uncertainties in result accuracy can typically be tolerated in such time-series databases, given a specific error threshold, the MMV technique determines a minimal subset of the time-series observations that can be used to answer a query without exceeding the error threshold. By virtue of these properties, MMV determines the optimal subset of data to pre-cache, and of equal importance for overall performance, determines what data to best exclude from query processing without significantly affecting the query result. This so-called "dark data" is mostly incoherent random noise, which does not contribute to the structure of the time-series signals with respect to serial correlation, cross correlation, trends, or seasonality.

In time-series databases, a methodology that integrates database queries, MMV and GAC are used to optimally select a tiny fraction of the most-relevant time-series data for pre-caching. Note that the MMV process can be set with a default of subset ratio δ of 10%, while ensuring the selected vectors optimally represent the true underlying structure of the time-series data. GAC is then used to further condense the optimal vectors selected by MMV in a manner that preserves the granularity of the most-recent data in a time-series data. The resulting condensed optimal vectors can be cached to facilitate multiple types of queries, which are commonly used for anomaly discovery in business-critical assets and processes, prognostic cybersecurity for cloud telemetry, discovery of "change points" signifying the incipience of a new degradation mode, and new components to seasonality. This new technique also preserves the relevance of the aged historical data, which are used not to discover new defect modes in the processes running, but rather to discover long-term trends that are impossible to discern from weekly or monthly noisy processes.

By combining MMV with GAC, the system retains the highest relevance for the most-recent data, and highest relevance for the most-aged historical data by systematically varying the degree of statistical compression from recent to aged in a manner that is non-lossy on either end of the scale. Moreover, the new technique requires no hardware upgrades in the database solution stack, making the new technique backward-compatible with any existing large-scale time-series databases and any legacy enterprise computing systems. Before we describe the technique in more detail, we first describe an exemplary prognostic-surveillance system in which it can operate.

Exemplary Prognostic-Surveillance System

FIG. 1 illustrates an exemplary prognostic-surveillance system 100 that makes use of a time-series database 106 in accordance with the disclosed embodiments. Note that time-series database 106 can also be used in other systems, which, for example, use queries to identify trends, anomalies, interesting temporal patterns, comparisons between time-periods for change-point detection, and also for certifying the absence of trends or new patterns. Hence, the disclosed embodiments are not meant to be limited to the below-described time-series database that is used for prognostic-surveillance purposes.

As illustrated in FIG. 1, system 100 operates on a set of time-series signals 104 obtained from sensors in one or more critical assets 102. Note that critical assets 102 can generally include any type of machinery or facility, which includes sensors and generates time-series signals. Moreover, time-series signals 104 can originate from any type of sensor, which can be located in a component in critical assets 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from critical assets 102 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics*. 16 (2): 117-186.) In this way, prognostic-surveillance system 100 can proactively alert system operators of incipient anomalies, such as impending failures, hopefully with enough lead time so that such problems can be avoided or proactively fixed.

Time-Series Database Structure

Figure 2:
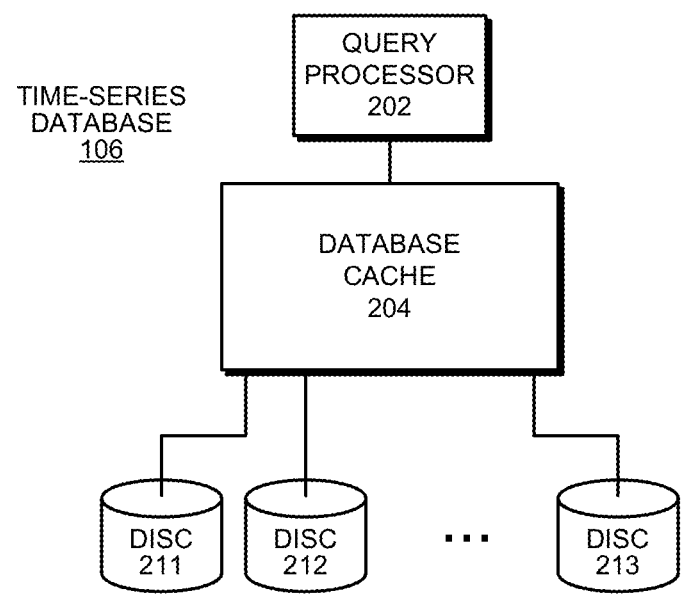
FIG. 2 illustrates the internal structure of a time-series database in accordance with the disclosed embodiments.

FIG. 2 illustrates the internal structure of time-series database 106 in accordance with the disclosed embodiments. As illustrated in FIG. 2, time-series database 106 includes a query processor 202, which processes queries by accessing time-series data stored in an in-memory database cache 204. Database cache 204 stores an active subset of time-series data obtained from a larger set of time-series data, which is stored in a number of disc drives 211-213.

Details of the MMV Technique

Figure 3A:
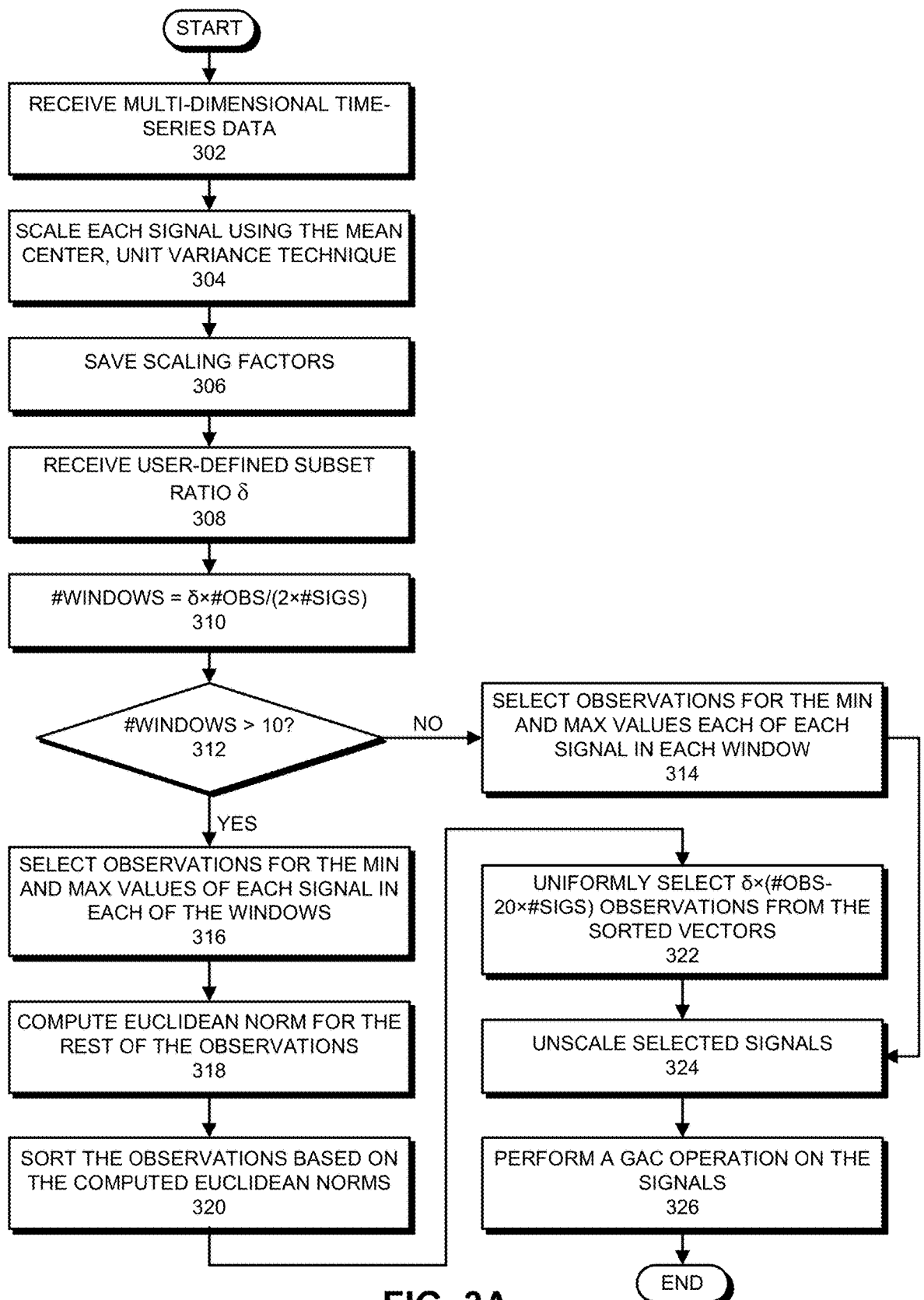
FIG. 3A presents a flow chart illustrating the process of performing an MMV operation on time-series data in accordance with the disclosed embodiments.

FIG. 3A presents a flow chart illustrating the process of performing an MMV operation on time-series data in accordance with the disclosed embodiments. At the starts of this process, the system first receives the multi-dimensional time-series data (step 302). Next, the system scales each signal in the received time-series data using the mean center, unit variance (MCUV) technique (step 304); the system also saves the scaling factors (step 306). Next, the system receives a user-defined subset ratio δ (step 308). In one embodiment, we let this subset ratio δ default to 10%. Note that this default ratio of 10% is quite conservative. When we have tried even smaller subset ratios, such as 5% and 4%, we still obtain outstanding results, and of course even higher database query performance (including "downstream" processing).

The system then computes a number of windows using the equation # windows=δ×# observations/(2×# signals) (step 310). The system then tests to see whether the number of windows is >10 (step 312). If not (NO at step 312), the system selects observations for the minimum and maximum values of each signal in each window (step 314). The system then unscales the selected signals (step 324), and performs a GAC operation on the signals (step 326) to complete the process.

On the other hand, if the number of windows is greater than 10 (YES at step 312), the system selects observations for the minimum and maximum values of each signal in each of the windows (step 316). The system then computes a Euclidean norm for the rest of the observations (step 318). Note that computing the Euclidean norm for a vector $x=(x_1, \ldots, x_n)$ involves computing $\sqrt{x_1^2+\ldots+x_n^2}$. The system then sorts the observations based on the computed Euclidean norms (step 320), and uniformly selects δ×(# observations−20)×# signals observations from the sorted vectors (step 322). The system then unscales the selected signals (step 324), and performs a GAC operation on the signals (step 326) to complete the process.

Figure 4:
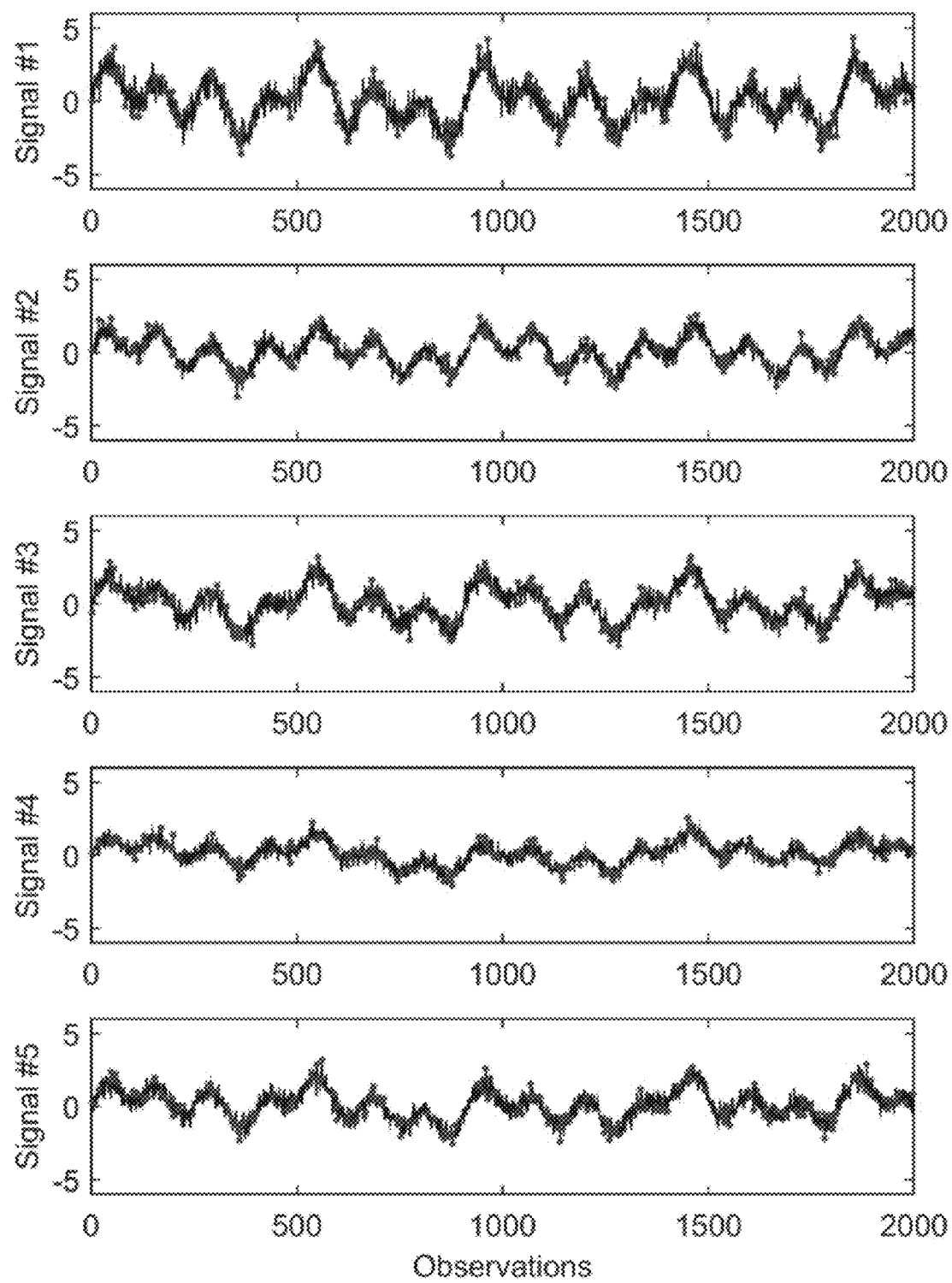
FIG. 4 presents a graph illustrating how 200 observations are selected out of 2000 observations in a five-signal system when the noise ratio is 0.5 in accordance with the disclosed embodiments.

FIG. 4 presents a graph illustrating how 200 observations are selected out of 2000 observations in a five-signal system when the noise ratio is 0.5 in accordance with the disclosed embodiments.

Figure 5:
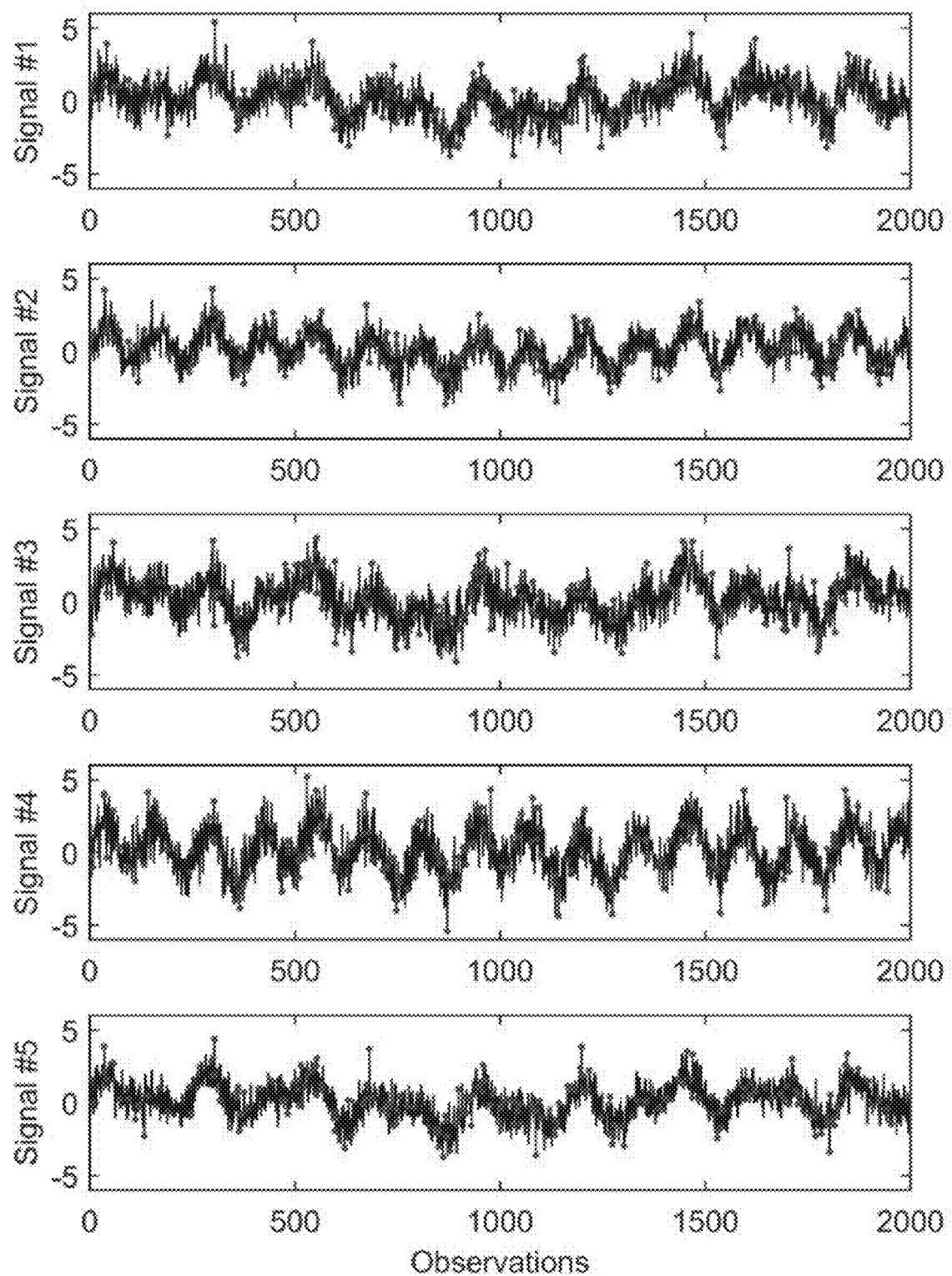
FIG. 5 presents a graph illustrating how 200 observations are selected out of 2000 observations in a five-signal system when the noise ratio is 1.0 in accordance with the disclosed embodiments.

FIG. 5 presents a graph illustrating how 200 observations are selected out of 2000 observations in a five-signal system when the noise ratio is 1.0 in accordance with the disclosed embodiments.

Figure 3B:
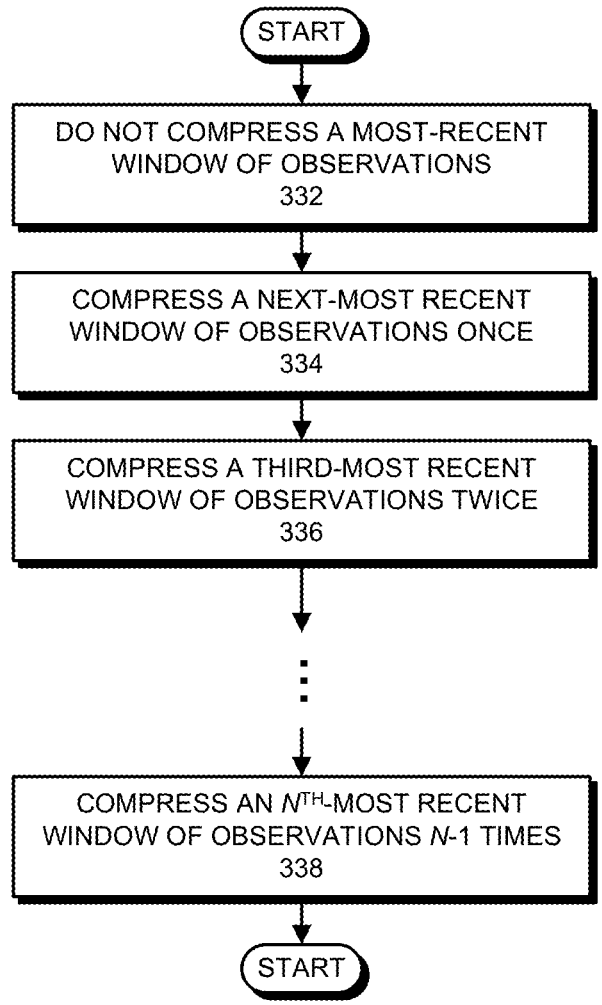
FIG. 3B presents a flow chart illustrating the process of performing a GAC operation on time-series data in accordance with the disclosed embodiments.

To provide more details about GAC, FIG. 3B presents a flow chart illustrating the process of performing the GAC operation on the selected signals in accordance with the disclosed embodiments. During the GAC operation, the system does not compress a most-recent window of observations (step 332). The system compresses a next-most recent window of observations once (step 334). (Note that the GAC operation compresses observations by averaging pairs of consecutive observations.) The system also compresses a third-most recent window of observations twice (step 336). This process continues until the system compresses the $n^{th}$-most recent window of observations n−1 times (step 338).

To explain how GAC works, consider a single "window" of time-series data. For example, if we have a time-series database with 1000 hours of time-series telemetry, consider a window having $\frac{1}{10}^{th}$ of that data, comprising 100 hours of telemetry data. If we desire to "reduce the volume" for this window of time-series signals, we could naively select and retain 1-out-of-N observations. This would reduce the data volume by a factor of N. However, this would be undesirable if a customer were ultimately going to attempt to detect "anomalies," which might manifest themselves as narrow spikes in the time-series data. For example, if we were to select 1-out-of-3 observations in the window for retention, and there were a very narrow "spike" in the data in just one observation, then we would have a ⅔rds probability of missing the spike.

If we instead reduce the volume of data using a statistical compression technique that simply averages each adjacent pair of observations, and then retains the averages, we achieve a 50% reduction in data volume, while retaining the ability to "see" such spikes. Hence, if there were a one-observation spike in the data, then the pairwise averages would include a spike only ½ as high. However, the "noise" before and after the spike would be reduced as well. Hence, mechanisms that detect spikes in noise will still detect the fact that there was a spike in the time-series data, even after the pairwise statistical compression.

At the core of the GAC operation is an elemental simplistic pairwise compression computation that averages adjacent pairs of observations. Note that if we were to naively apply pairwise compression to the entire time-series database, it would cut the volume of data in half, but would not be beneficial for the most-recent observations ingested into the time-series database. Note that a primary use of database queries in large-scale time-series databases, which originate from IoT sensors, is evaluating the appearance of new trends in processes or assets, new anomalies growing into the processes, and new degradation modes in the sensors monitoring the critical assets, and of equal importance, certifying that none of the preceding phenomena are growing into the processes. For these important objectives, the most-recent data is the most important, and having the very finest granularity possible for the most-recent data contributes to these objectives. Any operation that "smooths" out the most-recent data diminishes the system's sensitivity for detecting anomalies, trends, and new seasonality-components, which are creeping into processes and critical assets.

In contrast, the most common use for long-term archived signals is to evaluate long-term trends in the historical data. Note that statistical compression does not diminish this objective. In fact, it enhances this objective because for long-term historical analyses, if there is a subtle trend in the data, (e.g., the mean of a noisy process is growing at just a fraction of a percent per year), which is impossible to discern in a week's worth of data, but is very evident in 10 years of data, statistical compression makes the long-term trends even more obvious, because it improves the signal-to-noise ratio for the long-term analyses.

Table I below provides an illustrative example of the degree of statistical compression achieved as one "recedes in time" through a multi-year archive of time-series signals, where the "temporal windows" are one week each for the iterative GAC process.

TABLE I

| Week Number | Size of Ensemble Averages (time units) |
|---|---|
| 1 | 1 |
| 2 | 2 |
| 3-4 | 3 |
| 5-8 | 8 |
| 9-16 | 16 |
| 17-32 | 32 |
| 33-64 | 64 |
| 65-128 | 128 |
| 129-256 | 256 |

Process of Caching Time-Series Data

Figure 6:
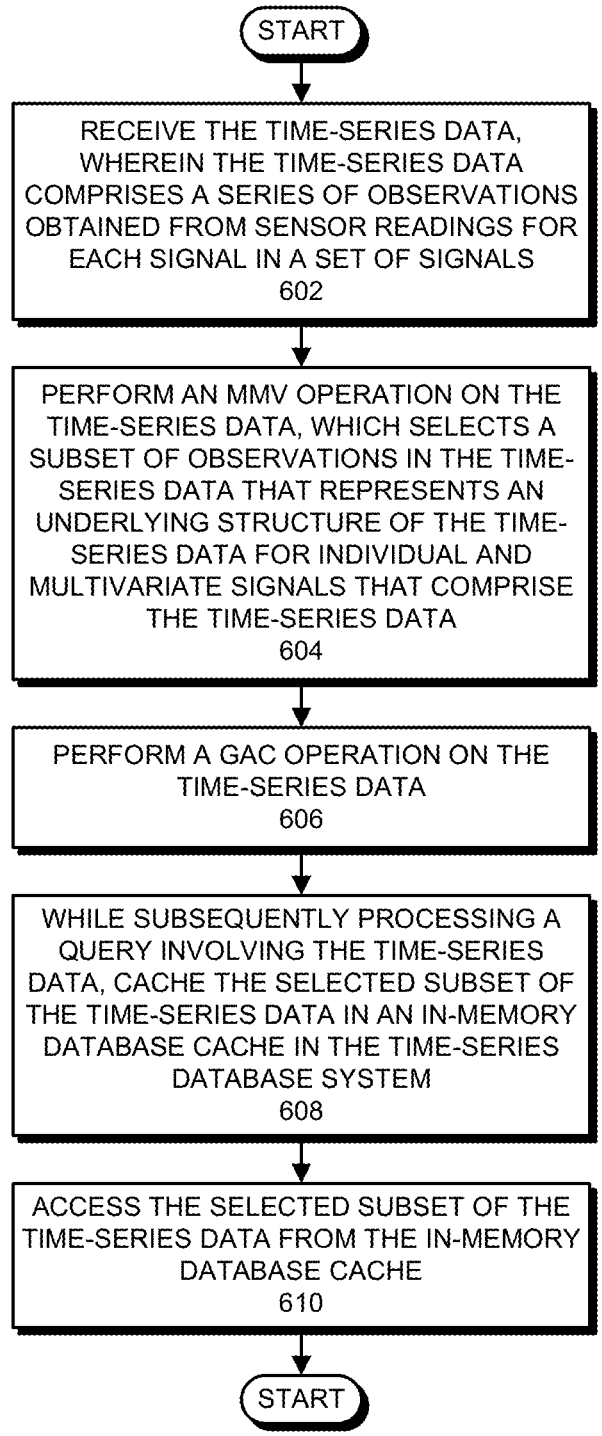
FIG. 6 presents a flow chart illustrating the process of using the MMV technique to facilitate caching time-series data in accordance with the disclosed embodiments.

FIG. 6 presents a flow chart illustrating the process of using the MMV technique to facilitate caching time-series data in accordance with the disclosed embodiments. During operation, the system receives the time-series data, wherein the time-series data comprises a series of observations obtained from sensor readings for each signal in a set of signals (step 602). Next, the system performs an MMV operation on the time-series data, which selects a subset of observations in the time-series data that represents an underlying structure of the time-series data for individual and multivariate signals that comprise the time-series data (step 604). The system also performs a GAC operation on the time-series data (step 606). Then, while subsequently processing a query involving the time-series data, the system caches the selected subset of the time-series data in an in-memory database cache in the time-series database system (step 608). Finally, the system accesses the selected subset of the time-series data from the in-memory database cache (step 610).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for caching time-series data in a time-series database system, comprising:
   receiving the time-series data, wherein the time-series data comprises a series of observations obtained from sensor readings for each signal in a set of signals;
   performing a multivariate memory vectorization (MMV) operation on the time-series data, which selects a subset of observations in the time-series data that represents an underlying structure of the time-series data for individual and multivariate signals that comprise the time-series data, wherein performing the MMV operation on the time-series data comprises:
      scaling observations for each signal in the time-series data using a mean center, unit variance technique,
      dividing observations in the scaled time-series data into a set of windows for consecutive time intervals,
      for each window in the set of windows, selecting observations that include minimum and maximum values for each signal in the set of signals,
      for all remaining observations in each window, computing a Euclidean norm,
      sorting the remaining observations in each window based on the Euclidean norms,
      uniformly selecting a subset of the remaining observations based on the sorted Euclidean norms, and
      unscaling all selected observations; and
   while subsequently processing a query involving the time-series data,
      caching the selected subset of the time-series data in an in-memory database cache in the time-series database system, and
      accessing the selected subset of the time-series data from the in-memory database cache.

2. The method of claim 1, wherein the MMV operation selects the subset of observations that represents the underlying structure of the time-series data with respect to one or more of the following: serial correlation, cross correlation, seasonality and stochastic structure.

3. The method of claim 1,
   wherein after performing the multivariate memory vectorization operation on the time-series data, the method further comprises performing a geometric aging compression (GAC) operation on the time-series data;
   wherein the GAC operation compresses observations by averaging pairs of consecutive observations; and
   wherein the GAC operation:
      does not compress a most-recent window of observations;
      compresses a next-most recent window of observations once;
      compresses a third-most recent window of observations twice; and
      compresses an $n^{th}$-most recent window of observations n−1 times.

4. The method of claim 1, wherein receiving the time-series data includes receiving the time-series data directly from sensors, which generated the observations that comprise the time-series data.

5. The method of claim 1, wherein receiving the time-series data includes retrieving the time-series data from a storage medium in the time-series database system.

6. The method of claim 1,
   wherein after performing the MMV operation, the selected subset of observations is stored on rotating storage in the time-series database system; and
   wherein caching the selected subset of the time-series data involves moving the selected subset of observations from the rotating storage to the in-memory database cache.

7. The method of claim 1, wherein the time-series data system comprises a multi-dimensional time-series database system.

8. A non-transitory, computer-readable storage medium storing instructions that when executed by a computer cause the computer to perform a method for caching time-series data in a time-series database system, the method comprising:
   receiving the time-series data, wherein the time-series data comprises a series of observations obtained from sensor readings for each signal in a set of signals;
   performing a multivariate memory vectorization (MMV) operation on the time-series data, which selects a subset of observations in the time-series data that represents an underlying structure of the time-series data for individual and multivariate signals that comprise the time-series data, wherein performing the MMV operation on the time-series data comprises:
      scaling observations for each signal in the time-series data using a mean center, unit variance technique,
      dividing observations in the scaled time-series data into a set of windrows for consecutive time intervals,
      for each window in the set of windows, selecting observations that include minimum and maximum values for each signal in the set of signals,
      for all remaining observations in each window, computing a Euclidean norm,
      sorting the remaining observations in each window based on the Euclidean norms,
      uniformly selecting a subset of the remaining observations based on the sorted Euclidean norms, and
      unscaling all selected observations; and
   while subsequently processing a query involving the time-series data,
      caching the selected subset of the time-series data in an in-memory database cache in the time-series database system, and accessing the selected subset of the time-series data from the in-memory database cache.

9. The non-transitory, computer-readable storage medium of claim 8, wherein the MMV operation selects the subset of observations that represents the underlying structure of the time-series data with respect to one or more of the following: serial correlation, cross correlation, seasonality and stochastic structure.

10. The non-transitory, computer-readable storage medium of claim 8,
wherein after performing the multivariate memory vectorization operation on the time-series data, the method further comprises performing a geometric aging compression (GAC) operation on the time-series data;
wherein the GAC operation compresses observations by averaging pairs of consecutive observations; and
wherein the GAC operation:
does not compress a most-recent window of observations;
compresses a next-most recent window of observations once;
compresses a third-most recent window of observations twice; and
compresses an $n^{th}$-most recent window of observations n−1 times.

11. The non-transitory, computer-readable storage medium of claim 8, wherein receiving the time-series data includes receiving the time-series data directly from sensors, which generated the observations that comprise the time-series data.

12. The non-transitory, computer-readable storage medium of claim 8, wherein receiving the time-series data includes retrieving the time-series data from a storage medium in the time-series database system.

13. The non-transitory, computer-readable storage medium of claim 8,
wherein after performing the MMV operation, the selected subset of observations is stored on rotating storage in the time-series database system; and
wherein caching the selected subset of the time-series data involves moving the selected subset of observations from the rotating storage to the in-memory database cache.

14. The non-transitory, computer-readable storage medium of claim 8, wherein the time-series data comprises multivariate time-series data.

15. A system that certifies provenance of time-series data in a time-series database, comprising:
at least one processor and at least one associated memory; and
a caching mechanism that executes on the at least one processor, wherein during operation, the caching mechanism:
receives the time-series data, wherein the time-series data comprises a series of observations obtained from sensor readings for each signal in a set of signals;
performs a multivariate memory vectorization (MMV) operation on the time-series data, which selects a subset of observations in the time-series data that represents an underlying structure of the time-series data for individual and multivariate signals that comprise the time-series data, wherein performing the MMV operation on the time-series data comprises:
scaling observation for each signal in the time-series data using a mean center, unit variance technique,
dividing observations in the scaled time-series data into a set of windows for consecutive time intervals,
for each window in the set of windows, selecting observations that include minimum and maximum values for each signal in the set of signals,
for all remaining observations in each window, computing a Euclidean norm,
sorting the remaining observations in each window based on the Euclidean norms,
uniformly selecting a subset of the remaining observations based on the sorted Euclidean norms, and
unscaling all selected observations; and
while subsequently processing a query involving the time-series data,
caches the selected subset of the time-series data in an in-memory database cache in the time-series database system, and
accesses the selected subset of the time-series data from the in-memory database cache.

16. The system of claim 15, wherein the MMV operation selects the subset of observations that represents the underlying structure of the time-series data with respect to one or more of the following: serial correlation, cross correlation, seasonality and stochastic structure.

17. The system of claim 15,
wherein after performing the multivariate memory vectorization operation on the time-series data, the cache mechanism performs a geometric aging compression (GAC) operation on the time-series data;
wherein the GAC operation compresses observations by averaging pairs of consecutive observations; and
wherein the GAC operation:
does not compress a most-recent window of observations;
compresses a next-most recent window of observations once;
compresses a third-most recent window of observations twice; and
compresses an $n^{th}$-most recent window of observations n−1 times.

* * * * *

UNITED STATES PATENT AND TRADEMARK OFFICE
CERTIFICATE OF CORRECTION

PATENT NO. : 10,621,141 B2  
APPLICATION NO. : 15/885600  
DATED : April 14, 2020  
INVENTOR(S) : Gross et al.

Page 1 of 1

It is certified that error appears in the above-identified patent and that said Letters Patent is hereby corrected as shown below:

In the Claims

Column 10, Line 52, Claim 8, delete "windrows" and insert -- windows --, therefor.

Column 12, Line 13, Claim 15, delete "observation" and insert -- observations --, therefor.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*